US011477545B2

(12) United States Patent
Liu et al.

(10) Patent No.: US 11,477,545 B2
(45) Date of Patent: Oct. 18, 2022

(54) MODULAR TELECOMMUNICATIONS PATCH PANEL

(71) Applicant: CommScope Technologies LLC, Hickory, NC (US)

(72) Inventors: Zhihui Liu, Suzhou (CN); Danny Ghislain Thijs, Zonhoven (BE); Min Dong, Suzhou (CN); Yu Zhao, Suzhou (CN); Wenyong Wu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/062,088

(22) Filed: Oct. 2, 2020

(65) Prior Publication Data

US 2021/0112316 A1 Apr. 15, 2021

(30) Foreign Application Priority Data

Oct. 10, 2019 (CN) .......................... 201910956057.1

(51) Int. Cl.
*H04Q 1/02* (2006.01)
*H01R 13/74* (2006.01)
*H01R 13/518* (2006.01)

(52) U.S. Cl.
CPC .............. *H04Q 1/13* (2013.01); *H01R 13/518* (2013.01); *H01R 13/741* (2013.01)

(58) Field of Classification Search
CPC ....... H04Q 1/13; H01R 13/518; H01R 13/741
See application file for complete search history.

(56) References Cited

U.S. PATENT DOCUMENTS

| 5,836,786 | A | 11/1998 | Pepe |
|---|---|---|---|
| 6,015,307 | A | 1/2000 | Chiu et al. |
| 6,504,726 | B1 | 1/2003 | Grabinger et al. |
| 6,537,106 | B1 | 3/2003 | Follingstad |
| 6,866,541 | B2 | 3/2005 | Barker et al. |
| 7,094,095 | B1 | 8/2006 | Caveney |
| 7,112,090 | B2 | 9/2006 | Caveney et al. |
| 7,207,846 | B2 | 4/2007 | Caveney et al. |

(Continued)

FOREIGN PATENT DOCUMENTS

| WO | 99/19944 A1 | 4/1999 |
|---|---|---|
| WO | 2016/156644 A1 | 10/2016 |

(Continued)

OTHER PUBLICATIONS

"Mini-Com All Metal Shielded Modular Patch Panels, Installation Instructions", Panduit, 2 pages (2010).

(Continued)

*Primary Examiner* — Jean F Duverne
(74) *Attorney, Agent, or Firm* — Merchant & Gould P.C.

(57) ABSTRACT

In accordance with some aspects of the disclosure, a modular telecommunications patch panel system is shown and described. The panel can include a mounting frame extending between a first end and a second end, the mounting frame defining a plurality of apertures for receiving telecommunications components, a first mounting ear forming a snap-fit connection with the mounting frame first end, in a first orientation, and a second mounting ear, identical to the first mounting ear, forming a snap-fit connection with the mounting frame second end, in a second orientation.

20 Claims, 10 Drawing Sheets

(56) References Cited

U.S. PATENT DOCUMENTS

| | | |
|---|---|---|
| 7,220,145 B2 | 5/2007 | Denovich et al. |
| 7,335,056 B1 | 2/2008 | Clark et al. |
| 7,367,850 B1 | 5/2008 | Chang |
| 7,534,135 B2 | 5/2009 | Follingstad |
| 7,544,090 B2 | 6/2009 | Follingstad |
| 7,628,644 B1 | 12/2009 | Peluffo |
| 7,854,624 B1 | 12/2010 | Pepe |
| 7,874,865 B2 | 1/2011 | Tobey |
| 7,901,236 B2 | 3/2011 | Patchett |
| 7,909,622 B2 | 3/2011 | Pepe et al. |
| 7,914,324 B2 | 3/2011 | Pepe et al. |
| 8,834,199 B2 | 9/2014 | Foung et al. |
| 9,356,384 B2 | 5/2016 | Follingstad |
| 10,585,256 B1 | 3/2020 | Henley et al. |
| 2003/0022552 A1 | 1/2003 | Barker et al. |
| 2003/0129871 A1 | 7/2003 | Follingstad |
| 2005/0159036 A1 | 7/2005 | Caveney et al. |
| 2005/0191901 A1 | 9/2005 | Follingstad |
| 2006/0025011 A1 | 2/2006 | Follingstad |
| 2006/0228940 A1 | 10/2006 | Follingstad |
| 2007/0184712 A1 | 8/2007 | Martich et al. |
| 2008/0009183 A1 | 1/2008 | Wu |
| 2008/0090461 A1 | 4/2008 | Pepe et al. |
| 2008/0096438 A1 | 4/2008 | Clark et al. |
| 2008/0100069 A1* | 5/2008 | Morris ............... H04Q 1/14 312/263 |
| 2008/0115956 A1 | 5/2008 | Fransen et al. |
| 2008/0303392 A1 | 12/2008 | Pepe et al. |
| 2009/0034226 A1 | 2/2009 | Herndon et al. |
| 2009/0068881 A1 | 3/2009 | Patchett |
| 2009/0232455 A1 | 9/2009 | Nhep |
| 2009/0243757 A1 | 10/2009 | Xu et al. |
| 2009/0274422 A1 | 11/2009 | Henry et al. |
| 2010/0216335 A1 | 8/2010 | Cobb |
| 2010/0227500 A1 | 9/2010 | Shih |
| 2010/0255716 A1 | 10/2010 | Frey et al. |
| 2011/0115494 A1 | 5/2011 | Taylor et al. |
| 2012/0226807 A1 | 9/2012 | Panella et al. |
| 2012/0244752 A1 | 9/2012 | Patel et al. |
| 2013/0217249 A1 | 8/2013 | Patel et al. |
| 2014/0080354 A1 | 3/2014 | Caveney et al. |
| 2016/0021779 A1 | 1/2016 | Knight |
| 2016/0080836 A1 | 3/2016 | Carreras Garcia |
| 2017/0229825 A1 | 8/2017 | Baines et al. |
| 2017/0235076 A1* | 8/2017 | Solheid ............... G02B 6/3897 385/135 |
| 2017/0302040 A1 | 10/2017 | Taylor et al. |
| 2018/0287312 A1 | 10/2018 | De Dios Martín et al. |
| 2020/0351573 A1 | 11/2020 | Shih |
| 2021/0112678 A1 | 4/2021 | Liu et al. |
| 2021/0185417 A1 | 6/2021 | Shih et al. |

FOREIGN PATENT DOCUMENTS

| | | |
|---|---|---|
| WO | 2018/034870 A1 | 2/2018 |
| WO | 2018/236875 A1 | 12/2018 |
| WO | 2019/094558 A1 | 5/2019 |
| WO | 2019/094560 A1 | 5/2019 |

OTHER PUBLICATIONS

"Mini-Com® All Metal Shielded Modular Patch Panels, Installation Instructions, Specification Sheet", Panduit, 3 pages (2016).

* cited by examiner

MODULAR TELECOMMUNICATIONS PATCH PANEL

RELATED APPLICATION

This application claims priority to Chinese Patent Application Number 20190956057.1 filed on Oct. 10, 2019 and entitled Modular Telecommunications Panel and Modular Telecommunications System, the entirety of which is incorporated by reference into this application.

BACKGROUND

Patch panels are commonly used to enable inter-connection or cross-connection between telecommunications equipment. A typical patch panel includes a cable termination interface (e.g., optical adapters, electrical jacks, etc.) to connect one or more patch cables to respective connector elements. Additionally, patch panels can include fixtures to facilitate cable management and organization. Patch panels that provide more effective and/or efficient methods for cable termination and management are desired.

SUMMARY

In accordance with some aspects of the disclosure, a modular telecommunications patch panel system is shown and described. The panel can include a mounting frame extending between a first end and a second end, the mounting frame defining a plurality of apertures for receiving telecommunications components, a first mounting ear forming a snap-fit connection with the mounting frame first end, in a first orientation, and a second mounting ear, identical to the first mounting ear, forming a snap-fit connection with the mounting frame second end, in a second orientation.

In some examples, the mounting frame includes a first frame piece and a second frame piece operably connected to each other with a snap-fit connection.

In some examples, the first frame piece is directly connected to the second frame piece.

In some examples, the first and second frame pieces are parallel to each other.

In some examples, the first orientation is a position that is rotated 180 degrees from the second orientation.

In some examples, the mounting frame further includes a center connector connecting the first frame piece to the second frame piece, the center frame piece In some examples, the first frame piece is disposed at a non-zero angle to the second frame piece.

In some examples, the mounting frame has a 1U rack height. In some examples, the mounting frame has a 2U, 3U, 4U, or more rack height. In some examples, the frame pieces each have a 1U rack height and are stacked together to define a 2U, 3U, 4U, or more rack height.

In some examples, the panel further includes a plurality of jacks inserted into the plurality of apertures.

In some examples, each of the plurality of jacks can be inserted into one of the apertures from a front side of the mounting frame or from a rear side of the mounting frame.

In some examples, the mounting frame, first mounting ear, and second mounting ear are each formed from a polymeric material or a metal material.

A modular telecommunications panel can include a mounting frame extending between a first end and a second end, the mounting frame defining a plurality of apertures for receiving telecommunications components, a first mounting ear forming a snap-fit connection with the mounting frame first end, and a second mounting ear forming a snap-fit connection with the mounting frame second end.

In some examples, the mounting frame includes a first frame piece and a second frame piece operably connected to each other with a snap-fit connection.

In some examples, the first frame piece is directly connected to the second frame piece.

In some examples, the first and second frame pieces are parallel to each other.

In some examples, the first mounting ear is identical to the second mounting ear.

In some examples, the mounting frame further includes a center connector connecting the first frame piece to the second frame piece, the center frame piece.

In some examples, the first frame piece is disposed at a non-zero angle to the second frame piece.

In some examples, the mounting frame has a 1U rack height.

In some examples, the panel further includes a plurality of jacks inserted into the plurality of apertures.

In some examples, each of the plurality of jacks can be inserted into one of the apertures from a front side of the mounting frame or from a rear side of the mounting frame.

In some examples, the mounting frame, first mounting ear, and second mounting ear are each formed from a polymeric material or a metal material.

A modular telecommunications system can include a plurality of frame pieces operably connectable to each other via a snap-fit connection to form a mounting frame, a first pair of mounting ears operably connectable to the frame pieces via a snap-fit connection, the first pair of mounting ears being configured for use when the plurality of frames are interconnected such that they are parallel to each other, and a second pair of mounting ears operably connectable to the frame pieces via a snap-fit connection, the second pair of mounting ears being configured for use when the plurality of frames are interconnected such that they are disposed at a non-zero angle to each other.

In some examples, the system further includes a center connector for connecting two of the frame pieces together at a non-zero angle.

In some examples, the frame pieces can be directly connected together.

In some examples, each of the frame pieces has a first connection arrangement proximate a first end and a second connection arrangement proximate a second end, wherein the first and second connection arrangements are complimentarily shaped such that the first connection arrangement can form a snap-fit connection with the second connection arrangement of an adjacent frame piece.

In some examples, each of the first and second pairs of mounting ears includes a third connection arrangement connectible to the frame piece first and second connection arrangements.

In some examples, the third connection arrangement is connectable to the first connection arrangement in a first orientation of each of the first and second pairs of mounting ears and is connectable to the second connection arrangement in a second orientation of each of the first and second pairs of mounting ears.

In some examples, the first orientation is a position that is rotated 180 degrees from the second orientation.

A mounting frame for a telecommunications panel can include a first main body defining a plurality of apertures for receiving telecommunications components, and can include a plurality of snap-fit type connection arrangements located at an exterior side of the main body. In one aspect, the plurality of snap-fit type connection arrangements are configured to enable a snap-fit type connection with a second main body identical to the first main body.

In some examples, the mounting frame extends between a first end and a second end such that the plurality of apertures are located between the first and second ends, and wherein the plurality of snap-fit type connection arrangements includes a first snap-fit type connection arrangement located at the first end and a second snap-fit type connection arrangement located at the second end. In some examples, the first and second connection arrangements are identical but rotated 180 degrees with respect to each other.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
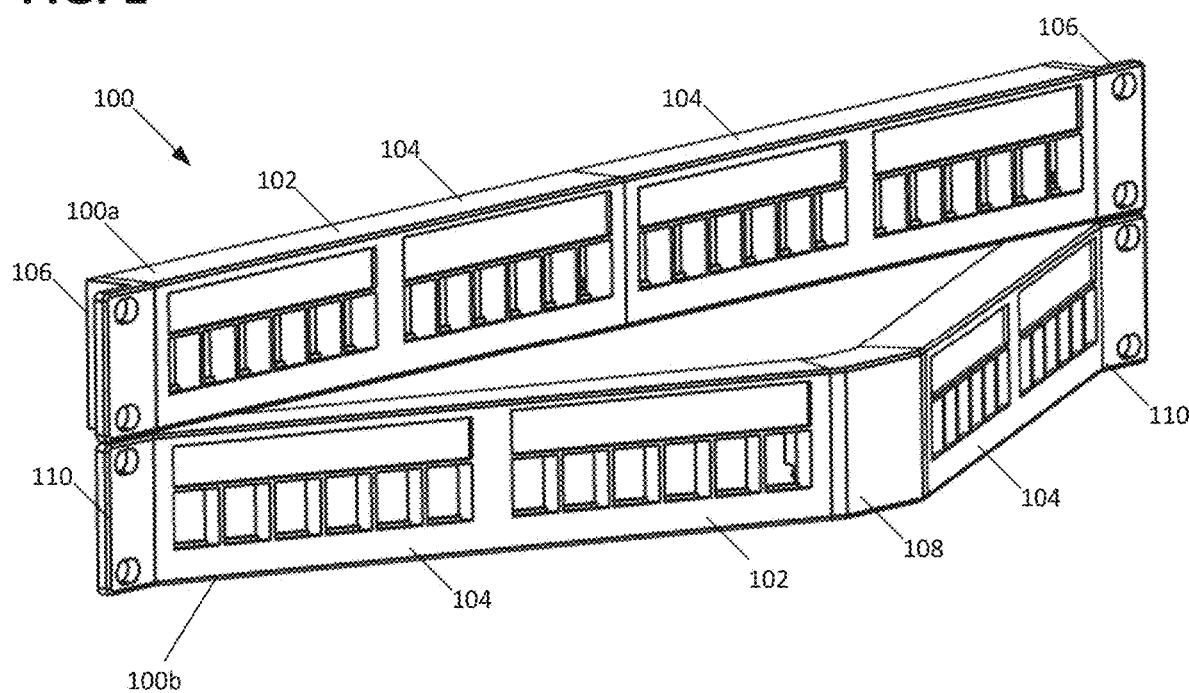
FIG. 1 is a front perspective view of an example modular telecommunications patch panel system having features in accordance with the principles of the present disclosure.
Figure 2:
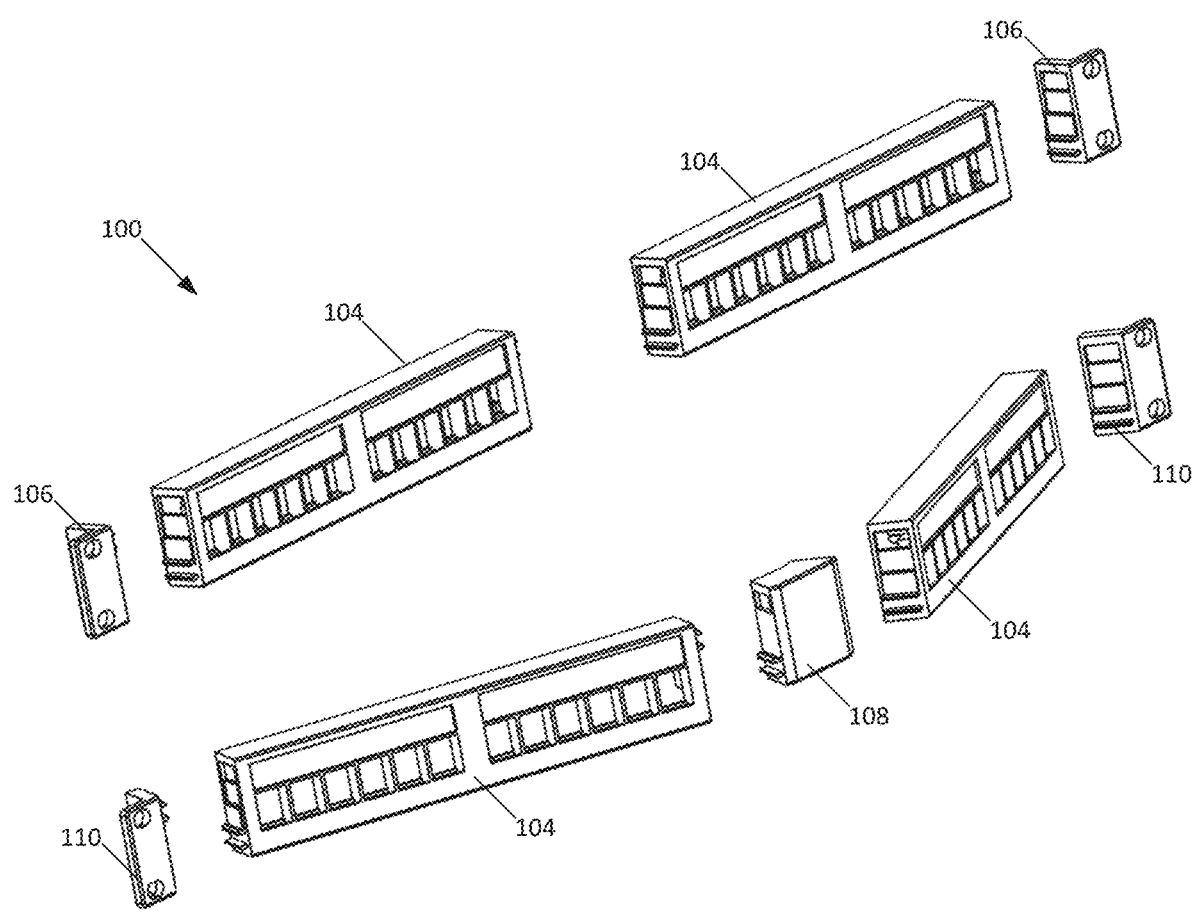
FIG. 2 is an exploded perspective view of the example modular telecommunications patch panel system shown in FIG. 1.

Referring to FIGS. 1 and 2, a modular telecommunications patch panel system 100 is shown and described. In one aspect the components of the patch panel system 100 can be arranged to provide different panel configurations. For example, FIGS. 1 and 2, show a first configuration of the patch panel 100a in which a mounting frame 102 is formed from a pair of interconnected frame pieces 104 to which mounting ears 106 are attached, wherein the frame pieces 104 are aligned in a parallel arrangement. As can be seen with the patch panel 100b, the same frame pieces 104 can be used in conjunction with a center connector piece 108 and differently configured mounting ears 110 to give the mounting frame a V-shaped arrangement in which the mounting frames 102 form a non-zero angle with respect to each other and are therefore disposed in a non-parallel relationship.

Figure 3:
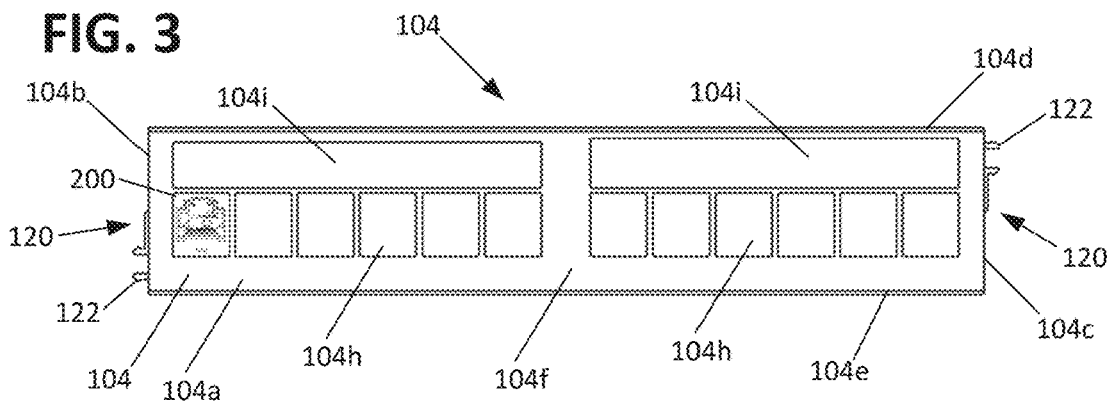
FIG. 3 is a front view of a mounting frame of the modular telecommunications patch panel system shown in FIG. 1.
Figure 4:
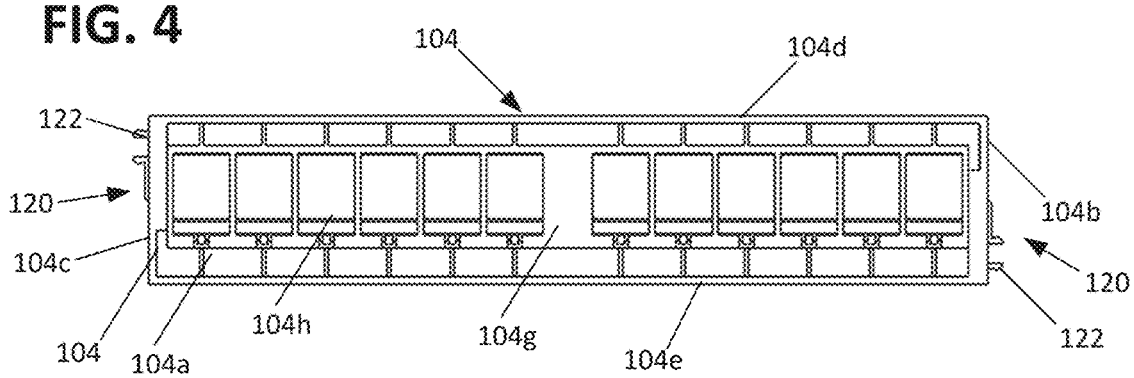
FIG. 4 is a rear view of the mounting frame shown in FIG. 3.
Figure 5:
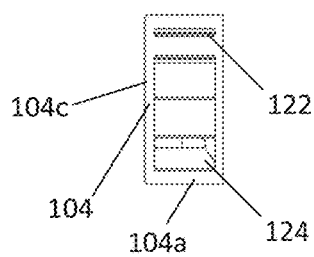
FIG. 5 is a first side view of the mounting frame shown in FIG. 3.
Figure 6:
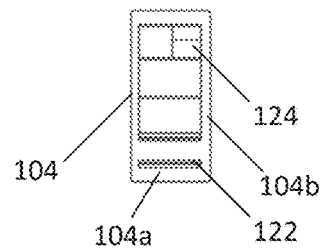
FIG. 6 is a second side view of the mounting frame shown in FIG. 3.
Figure 7:
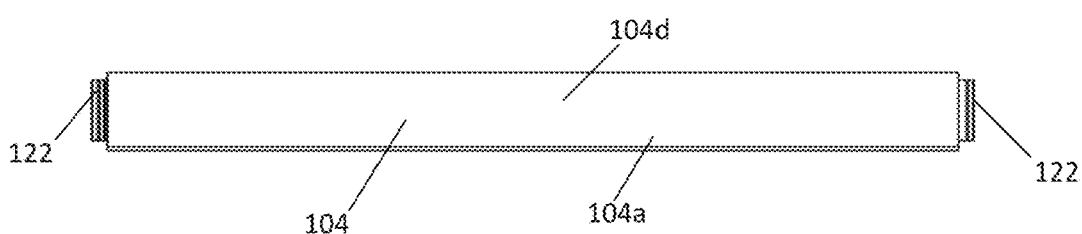
FIG. 7 is a top view of the mounting frame shown in FIG. 3.
Figure 8:
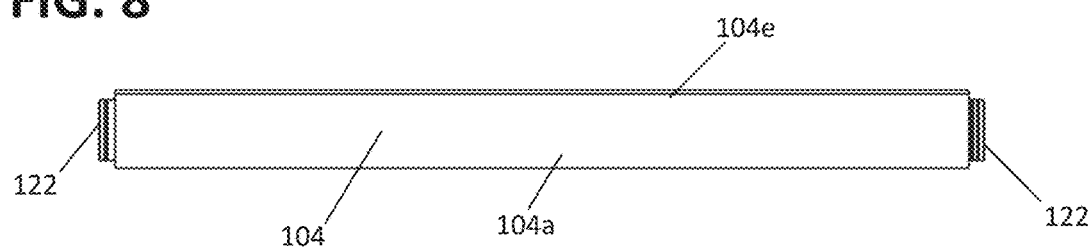
FIG. 8 is a bottom view of the mounting frame shown in FIG. 3.
Figure 29:
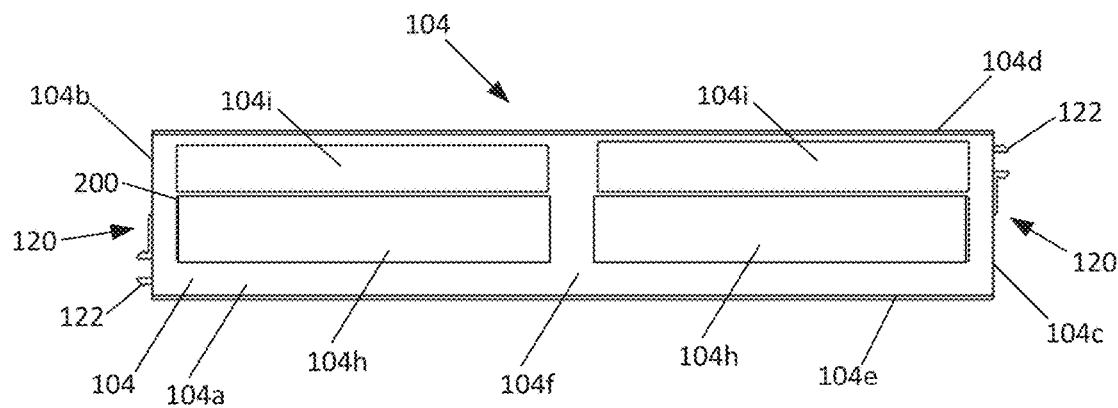
FIG. 29 is a front view of a second example mounting frame usable with the modular telecommunications patch panel system shown in FIG. 1.
Figure 30:
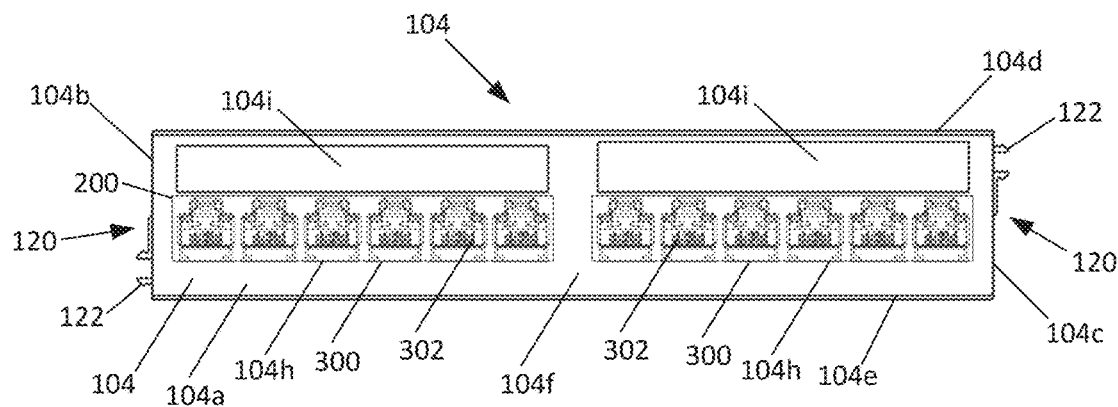
FIG. 30 is a front view of a third example mounting frame usable with the modular telecommunications patch panel system shown in FIG. 1.

Referring to FIGS. 3 to 8, the details of a frame piece 104 are shown in greater detail. In one aspect, the frame piece is defined by a main body 104a extending between a first end 104b and a second end 104c, a top side 104d and a bottom side 104e, and between a front face 104f and a rear face 104g. The frame piece main body 104a defines a plurality of apertures 104h configured to hold one or more types of cable termination interfaces 200. In the specific example shown, the cable termination interfaces 200 are electrical jacks 200 (as shown at FIG. 3). In other implementations, however, the apertures 104h could hold optical adapters or other media interfaces. In the example shown, each frame piece 104 defines 12 apertures 104h in a single row array. However, more or fewer apertures 104h may be provided. The apertures 104h can also be provided in more than one row, such as two rows. Apertures 104h can be sized to fit any of a plurality of types of jacks, for example RJ-type telecommunications jacks. The frame apertures 104a may be sized to receive jacks of the type shown and described in PCT International Patent Application Publication WO 2019/094560, published on May 16, 2019 and PCT PCT International Patent Application Publication WO 2016/156644, filed on Mar. 26, 2016, the entireties of which are incorporated by reference herein. Referring to FIGS. 29 and 30, it is further illustrated that the frame pieces 104 could define a larger opening or openings 104h configured to receive a module having a plurality of cable termination interfaces 200 or jacks 200. As shown at FIG. 29, two such openings 104h are provided in the frame piece 104. With such a configuration, a module can be provided that has discrete openings 104h of the type shown at FIG. 3 or, alternatively, can be provided with jacks 200 in a fully constructed module. FIG. 30 shows the latter configuration wherein a pair of modules 300 are inserted into larger openings 104h, wherein the modules 300 include a plurality of telecommunications components 302 mounted to a common printed circuit board. In the particular example shown, the components 302 are RJ-type jacks.

In one aspect, the frame piece 104 is configured to define a 1U rack height. However, the frame pieces 104 can be provided with a taller dimension to define a 2U, 3U, 4U or more rack height. In one aspect, a pair of recesses 104i, located above the apertures 104f, are provided to receive labels such that the identity of the jacks 200 can be denoted with indicia on the labels.

Figure 27:
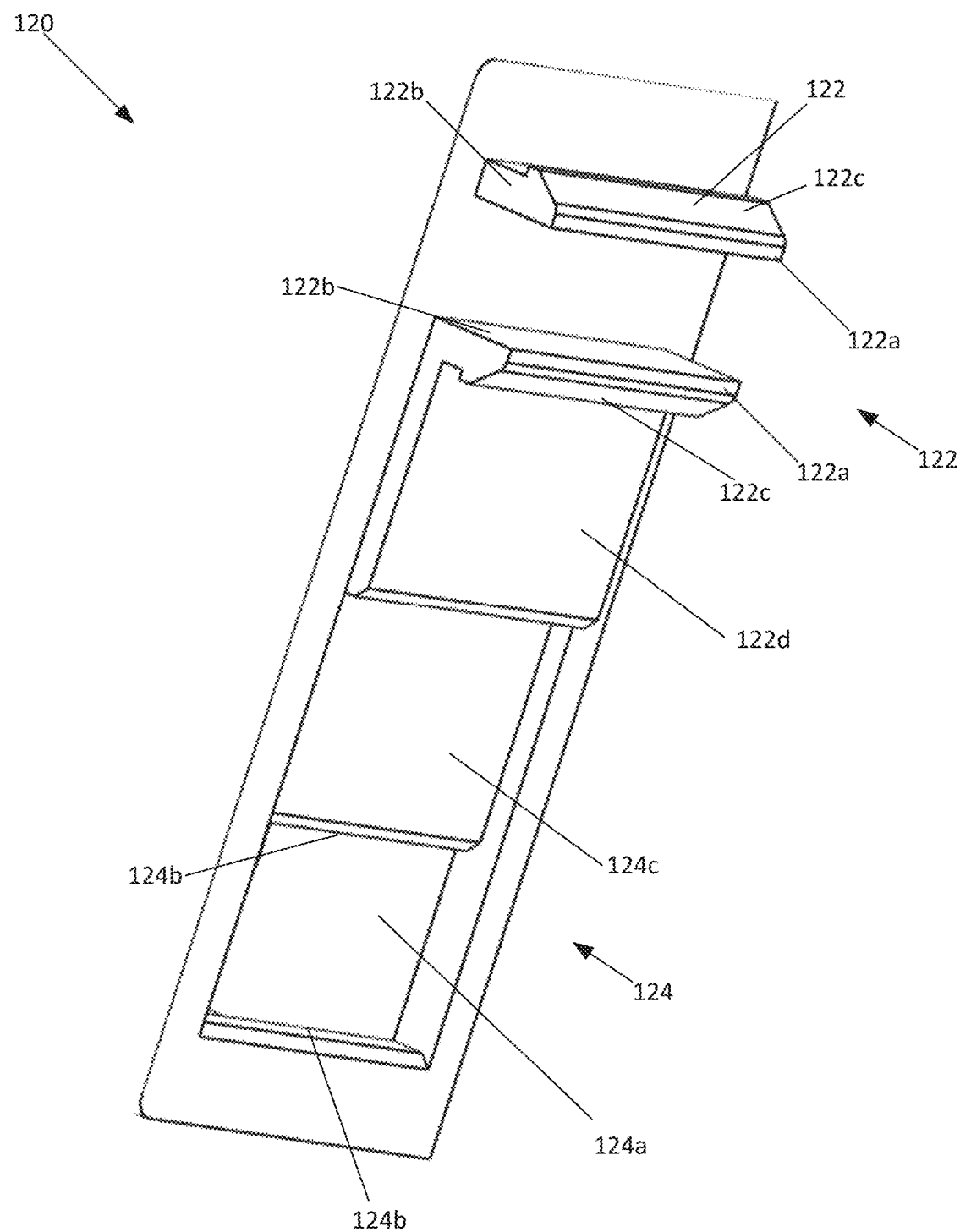
FIG. 27 is a perspective schematic view of a connection arrangement usable to interconnect the components of the telecommunications patch panel system shown in FIG. 1.
Figure 28:
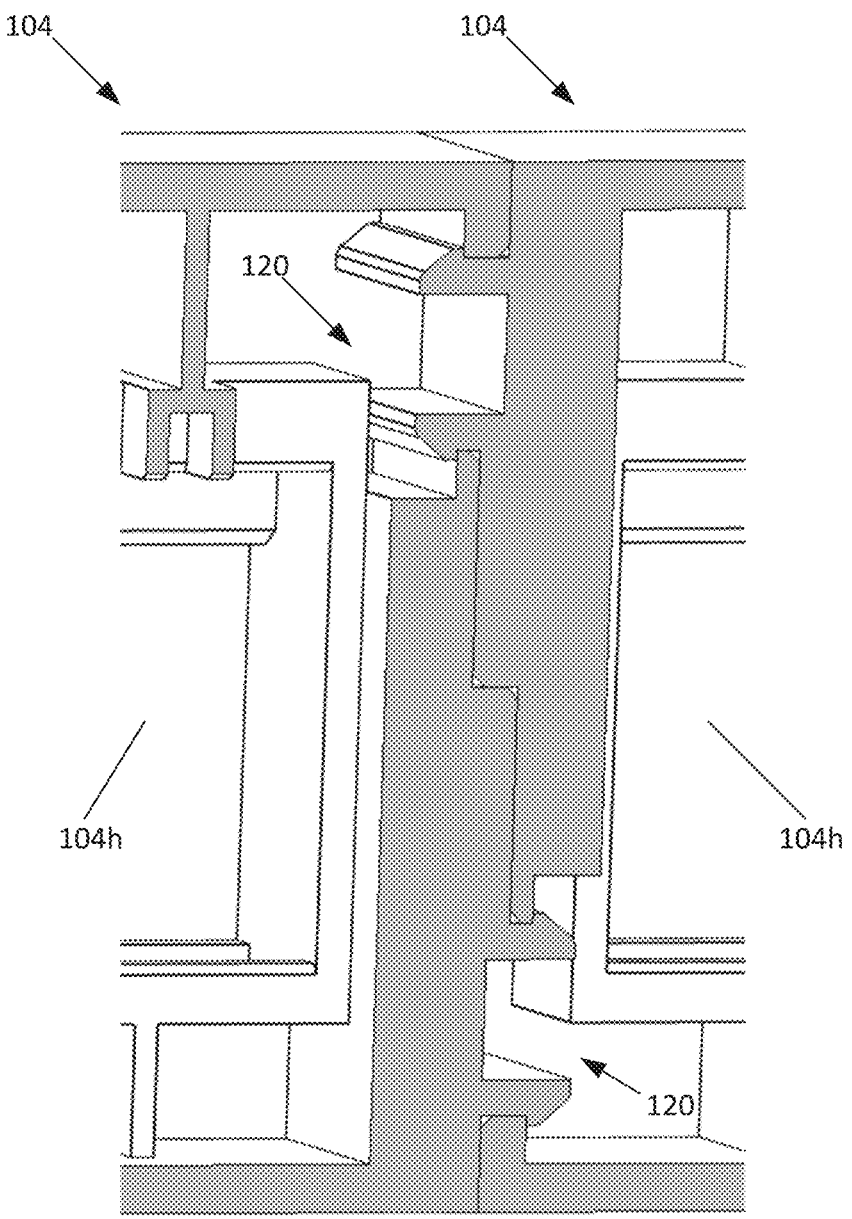
FIG. 28 is a perspective schematic view of a pair of interconnected mounting frames of the example modular telecommunications patch panel system shown in FIG. 1.

In one aspect, the first end 104b of the frame piece 104 is provided with a connection arrangement 120 including a first part 122 and a second part 124. For ease of reference the connection arrangement 120 is shown in isolation at FIG. 27. In the example shown, the first part 122 includes a pair of deflectable latch members 122a, each having a latch arm portion 122b and an outwardly facing latch portion 122c. The first part 122 is also shown as including a raised portion or protrusion 122d adjacent the latch members 122a. In the example shown, the second part 124 includes an aperture 124a defining a pair of catch surfaces 124b for receiving the latch portions 122c of the latch members 122a. The second part 124 is further shown as including a recess 124c which receives the raised portion or protrusion 122d of the first part 122. In the example shown, the connection arrangement 120 proximate the frame piece first end 104b is configured such that the first part 122 is proximate the top side 104d of the frame piece 104 and such that the second part 124 is proximate the bottom side 104e of the frame piece 104. The frame piece second end 104c is also provided with the connection arrangement 120. However, the connection arrangement 120 at the second end 104c is configured oppositely in that the second part 124 is proximate the top side 104d of the frame piece 104 and such that the first part 122 is proximate the bottom side 104e of the frame piece 104.

With the disclosed configuration, multiple frame pieces 104 can be connected directly together with a snap-fit type connection provided by the interlocking connection arrangements 120 such that the latch portions 122c of connection arrangements 120 associated with two adjacent frame pieces 104 are snapped into and against the catch surfaces 124b of the adjacent connection arrangements 120, with the raised portion or protrusion 122d protrusions of each of the first parts 122 being received into the recesses 124c of the second parts 124. The interconnected frame pieces 104 can be disconnected from each other by using a tool, for example a screwdriver, to deflect the latch members 122a to disengage the latch portions 122c from the catch surfaces 124b.

Figure 31:
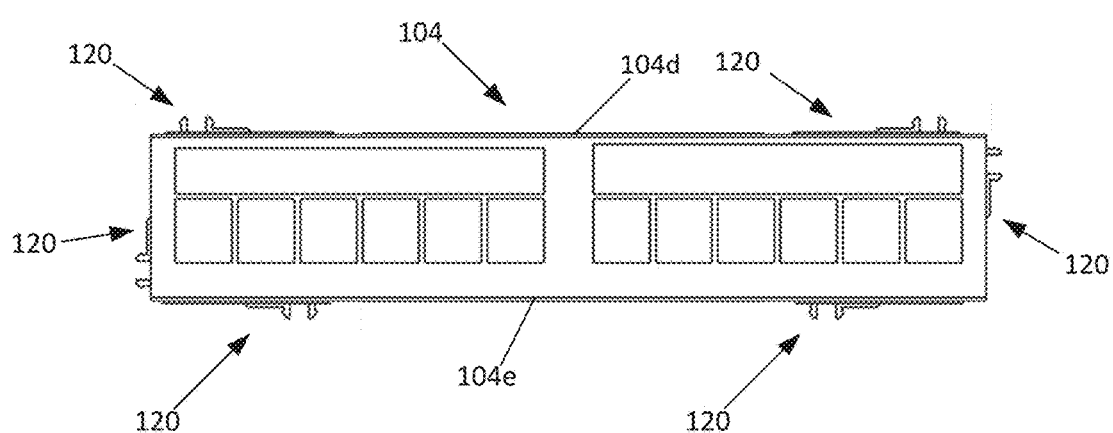
FIG. 31 is a front view of a fourth example mounting frame usable with the modular telecommunications patch panel system shown in FIG. 1.

While the connection arrangements 120 are shown as being on the ends 104b, 104c of the frame pieces 104 in FIGS. 1 to 8, the connection arrangements 120 can also be provided on the top and bottom walls 104d, 104e such that the frame pieces 104 can be also provided in a vertically stacked arrangement. A frame piece 104 configured for such interconnection is shown at FIG. 31. Where each frame piece 104 defines a 1U rack height, two frame pieces 104 can be stacked together to form a 2U rack height, three frame pieces 104 can be stacked together to form a 3U rack height, and so on to create any desired rack height.

Figure 9:
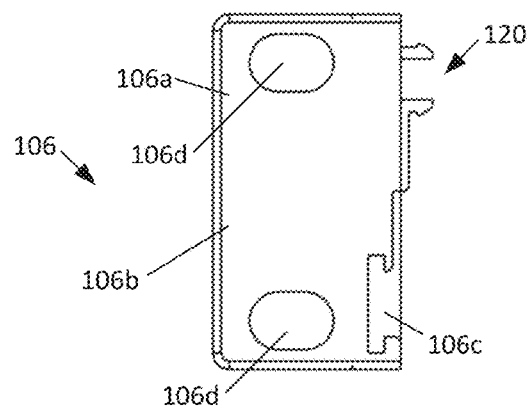
FIG. 9 is a front view of a first mounting ear of the modular telecommunications patch panel system shown in FIG. 1.
Figure 10:
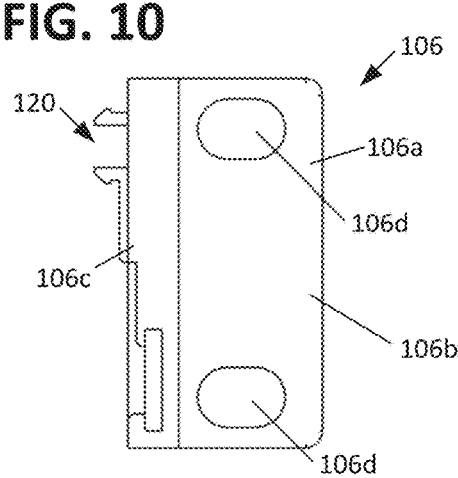
FIG. 10 is a rear view of the first mounting ear shown in FIG. 9.
Figure 11:
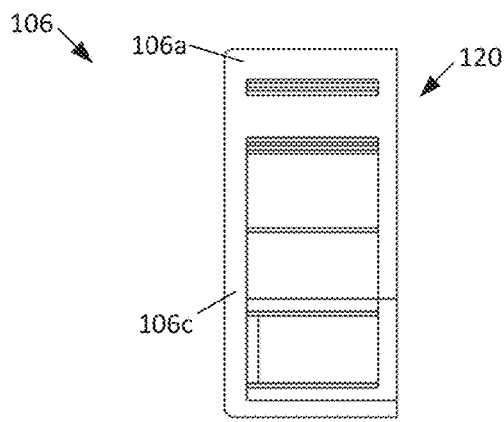
FIG. 11 is a first side view of the first mounting ear shown in FIG. 9.
Figure 12:
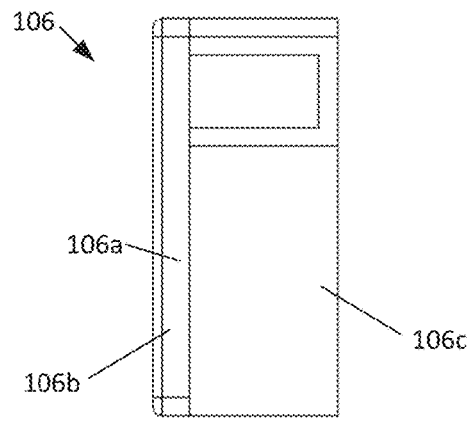
FIG. 12 is a second side view of the first mounting ear shown in FIG. 9.
Figure 13:
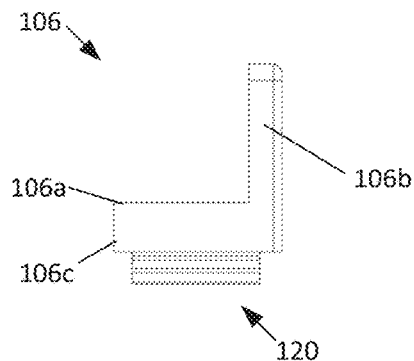
FIG. 13 is a top view of the first mounting ear shown in FIG. 9.
Figure 14:
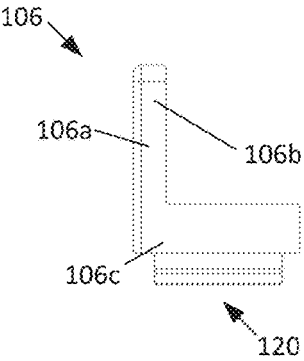
FIG. 14 is a bottom view of the first mounting ear shown in FIG. 9.
Figure 15:
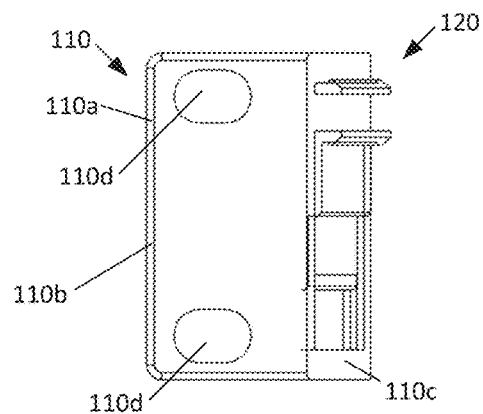
FIG. 15 is a front view of a second mounting ear of the modular telecommunications patch panel system shown in FIG. 1.
Figure 16:
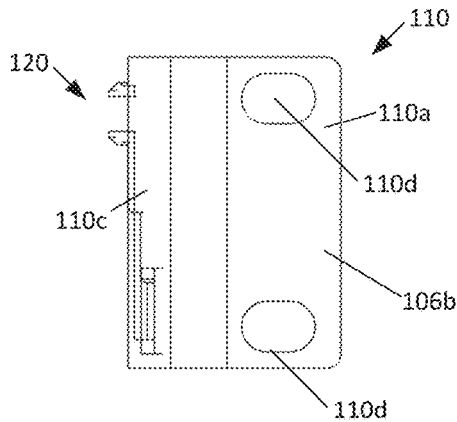
FIG. 16 is a rear view of the second mounting ear shown in FIG. 15.
Figure 17:
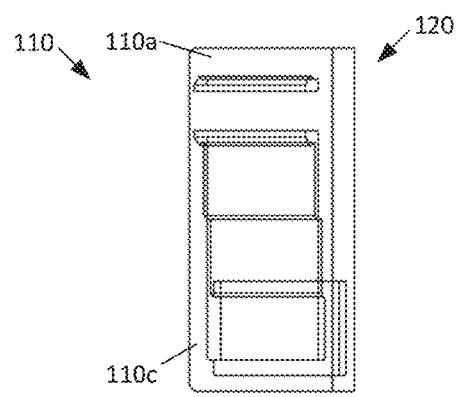
FIG. 17 is a first side view of the second mounting ear shown in FIG. 15.
Figure 18:
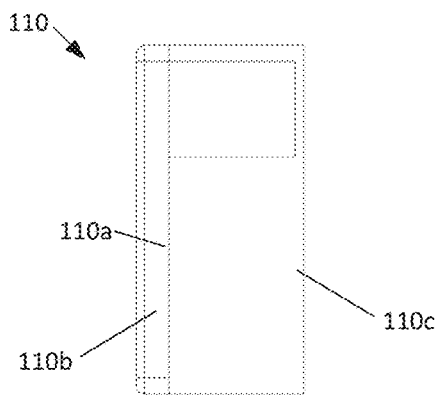
FIG. 18 is a second side view of the second mounting ear shown in FIG. 15.
Figure 19:
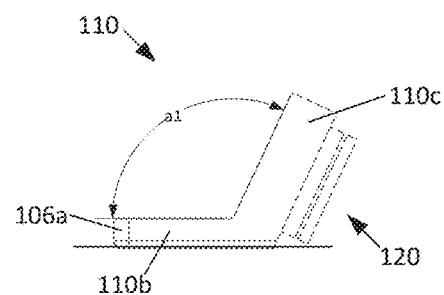
FIG. 19 is a top view of the second mounting ear shown in FIG. 15.
Figure 20:
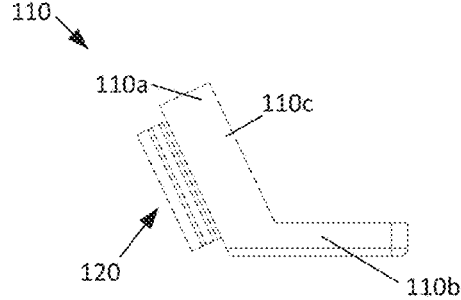
FIG. 20 is a bottom view of the second mounting ear shown in FIG. 15.
Figure 21:
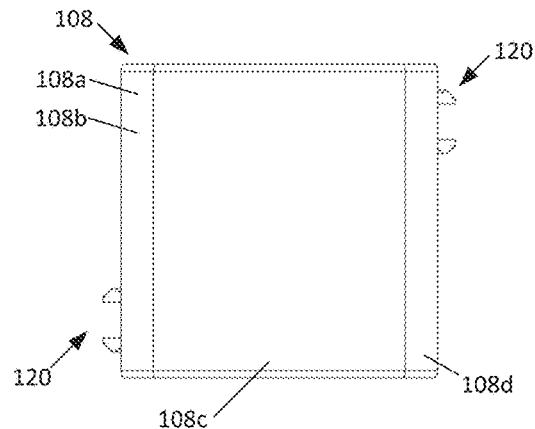
FIG. 21 is a front view of a center connector of the modular telecommunications patch panel system shown in FIG. 1.
Figure 22:
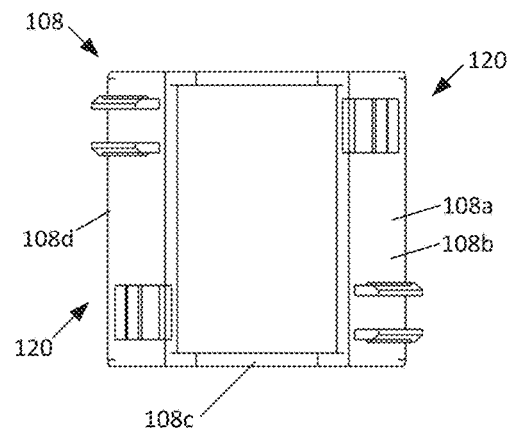
FIG. 22 is a rear view of the center connector shown in FIG. 21.
Figure 23:
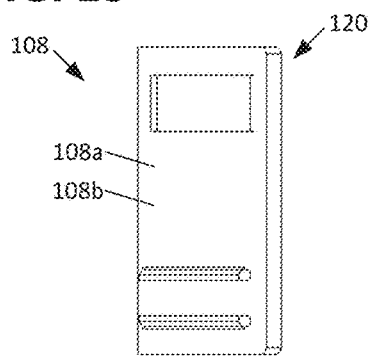
FIG. 23 is a first side view of the center connector shown in FIG. 21.
Figure 24:
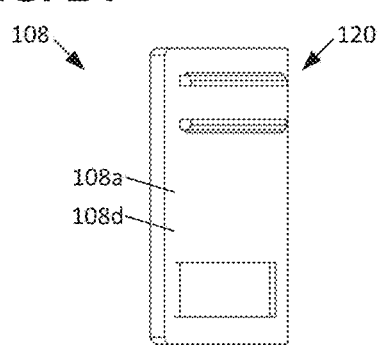
FIG. 24 is a second side view of the center connector shown in FIG. 21.
Figure 25:
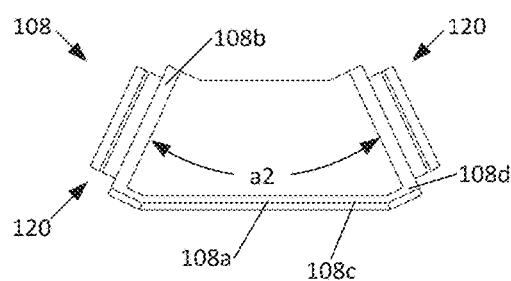
FIG. 25 is a top view of the center connector shown in FIG. 21.
Figure 26:
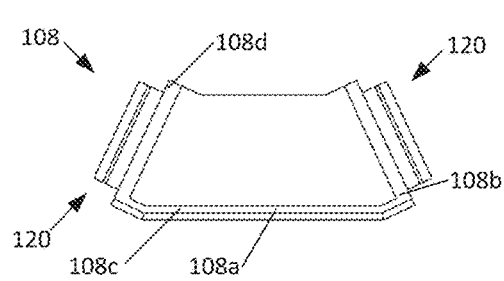
FIG. 26 is a bottom view of the center connector shown in FIG. 21.

Referring to FIGS. 9 to 14, the first mounting ear 106 is shown in greater detail. As shown, the first mounting ear 106 is formed from a main body 106a and has a first portion 106b and a second portion 106c disposed at a right angle to the first portion 106b. In one aspect, the first portion 106b is configured for mounting the panel 100 to a frame or chassis and includes a pair of apertures 106d for receiving fasteners, such as screws. The second portion 106c is configured to interconnect with either side of a frame piece 102. To this end, the second portion 106c is provided with the connection arrangement 120, as previously described. In one aspect, the apertures 106d in the first portion 106b are symmetrically located such that the apertures 106d are located similarly regardless of whether the mounting ear 106 is rotated in a first position, as shown at FIG. 9 and on the left side (of the page) in FIGS. 1 and 2 or is rotated 180 degrees into a second position, as shown on the right side (of the page) in FIGS. 1 and 2. This configuration enables the same mounting ear 106 to be used on both the left and right sides of a frame piece 102, thereby reducing the number of parts required to assembly a patch panel 100. With the connection arrangement 120 provided on the mounting ear second portion 106c, the connection arrangement 120 of the mounting ear 106 can engage with either connection arrangement 120 of the frame piece 102 by rotating the mounting ear into either the first or second position.

Referring to FIGS. 15 to 20, a second mounting ear 110 is shown. The second mounting ear 110 is generally similar to the first mounting ear 106, with the exception that the first portion 110b of the main body 110a is disposed at an oblique angle a1 to the second portion 110c. In the example shown, the angle a1 is about 115 degrees, thereby placing the second portion at about 25 degrees beyond the orthogonal configuration for the first mounting ear 106. The angle a1 enables for the first portion 110b to still be mounted flush to the chassis or frame while enabling for the connected frame piece 102 to extend at the angle a1 such that the frame pieces 102 can form the v-shaped configuration shown in FIGS. 1 and 2 with the use of the connector piece 108, described below.

Referring to FIGS. 21 to 26, the connector piece 108 is shown in further detail. As shown, the connector piece 108 includes a main body 108a, a first portion 108b, a second portion 108c, and a third portion 108d. In one aspect, the first and third portions 108b, 108d are each provided with the above-described connection arrangement 120, but with the connection arrangement 120 associated with the first portion 108b being rotated 180 degrees with respect to the connection arrangement 120 associated with the third portion 108d. The first and third portions 108b, 108d are also angled with respect to each other at an angle a2, which is shown as being about 50 degrees. This angle is twice the angle that the mounting ear second part 108c rotates past orthogonal with respect to the mounting ear first part 108b, which allows for the connection arrangements 120 on the first and third portions 108b, 108d to be aligned parallel with the connection arrangements 120 on the connected frame pieces 102. The angle a2 is also the supplementary angle to the angle between the frame pieces 102 connected to each other via the connector piece 108.

With the above-described components, multiple configurations of patch panel systems 100 can be constructed, including the aforementioned configurations of the patch panel 100a and 100b. Many other configurations are possible without departing from the concepts presented herein. In one aspect, each of the components 104, 106, 108, 110 is a unitary component formed from a polymeric material or from a metal material. In some examples, some of the components are formed from a polymeric material and some of the components are formed from a metal material.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A modular telecommunications panel comprising:
   a) a mounting frame having a front face extending between opposite first and second sides extending orthogonally from the front face, the mounting frame defining a plurality of apertures extending through the front face for receiving telecommunications components, the mounting frame including a first connection arrangement on the first side and a second connection arrangement on the second side;
   b) a first mounting ear having a first sidewall with a mounting aperture and having a second sidewall with a third connection arrangement forming a snap-fit connection with the first connection arrangement; and
   c) a second mounting ear, identical to the first mounting ear, having a first sidewall with a mounting aperture and having a second sidewall with a fourth connection arrangement forming a snap-fit connection with the second connection arrangement.

2. The modular telecommunications panel of claim 1, wherein the mounting frame includes a first frame piece and a second frame piece operably connected to each other with a snap-fit connection.

3. The modular telecommunications panel of claim 2, wherein the first frame piece is directly connected to the second frame piece.

4. The modular telecommunications panel of claim 3, wherein the first and second frame pieces are parallel to each other.

5. The modular telecommunications panel of claim 1, wherein the first mounting ear is mounted in a first orientation and the second mounting ear is mounted in a second orientation that is rotated 180 degrees from the first orientation.

6. The modular telecommunications panel of claim 2, wherein the mounting frame further includes a center connector connecting the first frame piece to the second frame piece.

7. The modular telecommunications panel of claim 6, wherein the first frame piece is disposed at a non-zero angle to the second frame piece.

8. The modular telecommunications panel of claim 1, wherein the mounting frame has a 1U rack height.

9. The modular telecommunications panel of claim 1, further including a plurality of jacks inserted into the plurality of apertures.

10. The modular telecommunications panel of claim 9, wherein each of the plurality of jacks can be inserted into one of the apertures from a front side of the mounting frame or from a rear side of the mounting frame.

11. The modular telecommunications panel of claim 1, wherein the mounting frame, first mounting ear, and second mounting ear are each formed from a polymeric material or a metal material.

12. A modular telecommunications system comprising:
   a) a plurality of frame pieces operably connectable to each other via a snap-fit connection to form a mounting frame;
   b) a first pair of mounting ears operably connectable to the plurality of frame pieces via a snap-fit connection such that the mounting ears can be provided on opposite sides of the mounting frame, the first pair of mounting ears being configured for use when the plurality of frame pieces are interconnected such that they are parallel to each other; and
   c) a second pair of mounting ears operably connectable to the plurality of frame pieces via a snap-fit connection such that the mounting ears can be provided on opposite sides of the mounting frame, the second pair of mounting ears being configured for use when the plurality of frame pieces are interconnected such that they are disposed at a non-zero angle to each other.

13. The modular telecommunications system of claim 12, further including a center connector for connecting two of the frame pieces together at a non-zero angle.

14. The modular telecommunications system of claim 12, wherein the plurality of frame pieces can be directly connected together.

15. The modular telecommunications system of claim 14, wherein each of the frame pieces has a first connection arrangement proximate a first end and a second connection arrangement proximate a second end, wherein the first and second connection arrangements are complimentarily shaped such that the first connection arrangement can form a snap-fit connection with the second connection arrangement of an adjacent frame piece.

16. The modular telecommunications system of claim 15, wherein each of the first and second pairs of mounting ears includes a third connection arrangement connectible to the frame piece first and second connection arrangements.

17. The modular telecommunications system of claim 16, wherein the third connection arrangement is connectable to the first connection arrangement in a first orientation of each of the first and second pairs of mounting ears and is connectable to the second connection arrangement in a second orientation of each of the first and second pairs of mounting ears.

18. The modular telecommunications system of claim 17, wherein the first orientation is a position that is rotated 180 degrees from the second orientation.

19. A mounting frame for a telecommunications panel, the mounting frame comprising:
   a) a first main body having a front face extending between opposite first and second sides, the front face defining a plurality of apertures for receiving telecommunications components, the first side including a first connection arrangement including a deflectable latch arm and an aperture defining a catch surface, the second side including a second connection arrangement including a deflectable latch arm and an aperture defining a catch surface, the first and second connection arrangements being configured to enable a snap-fit type connection with a second main body identical to the first main body.

20. The mounting frame of claim 19, wherein the first and second connection arrangements each further include a raised portion and a recessed portion, wherein the raised and recessed portions are located between the deflectable latch arms and the apertures.

* * * * *